United States Patent [19]

Mutoh et al.

[11] Patent Number: 5,610,574
[45] Date of Patent: Mar. 11, 1997

[54] DATA PROCESSING APPARATUS FOR VEHICLE

[75] Inventors: Eiji Mutoh; Shinichi Kubota; Susumu Maeda, all of Wako, Japan

[73] Assignee: Honda Giken Kogyo Kabushiki Kaisha, Tokyo, Japan

[21] Appl. No.: 464,373

[22] Filed: Jun. 5, 1995

[30] Foreign Application Priority Data

Feb. 17, 1995 [JP] Japan ................................ 7-052106

[51] Int. Cl.$^6$ .................................................. B60R 25/10
[52] U.S. Cl. .................. 340/426; 340/825.31; 307/10.5
[58] Field of Search .................... 340/426, 825.3, 340/825.31; 307/10.5

[56] References Cited

U.S. PATENT DOCUMENTS

| | | | |
|---|---|---|---|
| 4,209,782 | 6/1980 | Donath et al. | 70/278 |
| 4,274,080 | 6/1981 | Brunken | 307/10.5 |
| 4,291,237 | 9/1981 | Kitano | 307/10.3 |
| 4,366,466 | 12/1982 | Lutz | 307/10.5 |
| 4,754,255 | 6/1988 | Sanders et al. | 340/430 |
| 4,788,542 | 11/1988 | Tanabe | 340/825.31 |
| 4,805,722 | 2/1989 | Keating et al. | 307/10.5 |
| 4,835,407 | 5/1989 | Kataoka et al. | 307/10.5 |
| 4,835,533 | 5/1989 | Akutsu | 307/10.5 |
| 4,888,575 | 12/1989 | De Vaulx | 307/10.5 |
| 4,965,460 | 10/1990 | Tanaka et al. | 307/10.2 |
| 4,993,627 | 2/1991 | Phelan et al. | 307/10.5 |
| 5,019,812 | 5/1991 | Göstahagberg et al. | 340/825.31 |
| 5,136,284 | 8/1992 | Kitamura | 307/10.5 |
| 5,159,329 | 10/1992 | Lindmayer et al. | 340/825.72 |
| 5,337,043 | 8/1994 | Gokcebay | 340/825.31 |
| 5,440,177 | 8/1995 | Bellin et al. | 307/10.5 |
| 5,508,687 | 4/1996 | Gebhardt et al. | 340/825.31 |

FOREIGN PATENT DOCUMENTS

| | | |
|---|---|---|
| 0372741 | 6/1990 | European Pat. Off. . |
| 3341900 | 5/1985 | Germany . |
| 3905651 | 8/1990 | Germany . |
| 9304520 | 9/1994 | Germany . |
| 4313779 | 11/1994 | Germany . |
| 4326089 | 2/1995 | Germany . |
| 4411451 | 5/1995 | Germany . |
| 4427108 | 2/1996 | Germany . |
| 61-40652 | 2/1986 | Japan . |
| 63-24066 | 2/1988 | Japan . |
| 2046827 | 11/1980 | United Kingdom . |
| 2288050 | 10/1995 | United Kingdom . |

Primary Examiner—Jeffrey Hofsass
Assistant Examiner—John A. Tweel, Jr.
Attorney, Agent, or Firm—Pollock, Vande Sande & Priddy

[57] ABSTRACT

A data processing apparatus for a vehicle which permits accurate and reliable registration of a key ID code in a vehicle. ID code detecting means detects an ID code received in succession from outside. The ID code detected previously is registered in the memory 132 for previous ID code; the ID code detected this time is registered in the memory 133 for the present ID code. First comparing means compares the previous ID code with the present ID code and if the two ID codes match, then the ID code is registered as a reference ID code in an EEPROM. Second comparing means compares the present ID code with the reference ID code and if the two ID codes match, then it issues an engine control enable (OK) signal to an engine CPU.

6 Claims, 4 Drawing Sheets

SAME KEY ID

OK

NG

DATA PROCESSING APPARATUS FOR VEHICLE

BACKGROUND OF THE INVENTION

1. Field of the Invention

The present invention relates to a data processing apparatus for a vehicle and, more particularly, to a data processing apparatus for a vehicle designed to register before-hand data received from outside a vehicle in nonvolatile memory means and to execute predetermined processing of said data with the other data subsequently received from outside the vehicle.

2. Description of the Prior Art

A variety of control parameters, i.e. learned values, which are required for computer-based control of respective vehicular sections, including engine control, are mostly stored in an electrically erasable programmable ROM (EEPROM) backed up by a battery. Writing such data or learned values into the EEPROM takes more time than writing to a conventional RAM, leading to more chances of such writing being encountered by a momentary interruption or drop in battery voltage or sporadic noise or the like. There is problem in that the occurrence of a noise or the like during the writing of the data or learned values from an engine control unit (ECU)to the EEPROM has caused "garbled data" and erroneous learned values to be written into the EEPROM.

In view of the increasing vehicle thefts in recent years, various types of anti-theft apparatuses have been proposed. Among those anti-theft apparatuses, there is one that is designed to immobilize a vehicle by electrical means if an attempt is made to start or drive the vehicle by using an illegitimate key. This is achieved by previously storing an identification code or a key ID code in a key, reading the key ID code when the key is inserted into a key cylinder to start the vehicle, comparing it with a reference ID code prestored in the vehicle, generating an enable signal only when there is a match between both ID codes, and enabling the engine to be started up only when an engine control unit successfully receives that signal, (see for instance, "Car Technology", Vol. 48, No. 8, 1994, pp. 59–64).

An example of such a conventional transponder type immobilizer is shown in FIG. 5. A key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the key 2 is inserted into the key cylinder and turned to the ignition on position, an ignition switch 7 is closed. In response to this, an immobilizer CPU 13 incorporated in a hybrid IC for immobilizer control (immobilizer HIC) 10 in an engine control unit (ECU) 30 operates, and operating electric power is supplied from a power amplifier of an antenna unit 19 to the transmitter 4 through the induction coil (antenna) 6. The antenna unit 19 is electrically connected to ECU 30 via a pair of connectors 40 and 50, along with terminal devices of the drive and control systems essential to the engine control such as a fuel injection valve 17 and a fuel pump 18. The moment electric power is supplied to the transmitter 4, the transmitter 4 reads the ID code stored in the key 2 and, as shown in FIG. 3, it periodically and continuously sends the ID code in sequence to the key cylinder 5 as long as the ignition switch 7 is kept ON.

The received key ID code is amplified by a power amplifier (not shown) in the antenna unit 19, and read into the immobilizer CPU 13 through an I/F circuit 12 in the immobilizer HIC 10, and temporarily stored in an appropriate ID code register 13B. In an EEPROM 14 of the HIC 10, a unique reference ID code assigned to each vehicle is prestored, and the reference ID code and the key ID code which was read in are compared with each other by a compare unit 13S of the CPU 13. If it is determined that there is a match between the two ID codes or they are in a predetermined relationship, an enable code is transmitted from the compare unit 13S to an engine CPU 16. At the same time, a starter relay is activated to initiate the rotation of a starter motor (not shown).

In a ROM 15 of the engine CPU 16, an engine control program is stored which includes at least an engine control algorithm, an I/O (Input/Output) control algorithm and an anti-theft algorithm. The engine CPU 16 operates according to the engine control program, and discriminates and verifies the reception of an enable code by the anti-theft algorithm. If the enable code is a correct code, engine CPU 16 performs a specific control based on the engine control algorithm for the respective terminal devices such as a fuel injection valve 17, a fuel pump 18 and an ignition control unit 20 on the signal port selected by the I/O control algorithm, thereby to enable the start and running of the vehicle.

If the reference ID code stored in the EEPROM 14 and the key ID code transmitted from the key 2 and read in do not match each other or they are not in a predetermined relationship, the compare function unit 13S does not issue an enable code. Accordingly, the start of the vehicle by the engine CPU 16 is inhibited, and a horn 21 is activated by the CPU 13 to provide an appropriate alarm and display. When the enable code transmitted from the compare unit 13S is not correct code, the start of the vehicle by the engine CPU 16 is also inhibited. Thus, the illegal start-up of the engine and the driving of the vehicle by a wrong key are prevented to ensure the vehicle anti-theft function.

In the transponder type immobilizer described above, it is necessary to register the ID code of the key 2 as the reference ID code on the vehicle, i.e. in the EEPROM 14, beforehand. The registration of the reference ID code is discussed under Japanese Patent Application No. 6-257375 by the present applicant et. al, and it is implemented, for example, as described below.

In the final production step, delivery inspection step, or the like, an arbitrary key 2 which has a key ID code stored therein is inserted into the key cylinder 5 switch of a completed vehicle and turned to activate the ignition switch 7. This causes electric power to be supplied from the antenna unit 19 to the transmitter 4 via the inductive coil, i.e. antenna, 6. The transmitter 4 then reads the ID code stored in the key 2 and sends it to the key cylinder 5. The received key ID code is serially transferred to and read in the immobilizer CPU 13 via the antenna unit 19 and the I/F circuit 12. If the regular registration of the ID code has been implemented according to a predetermined procedure, then the immobilizer CPU 13 registers the key ID code as the reference ID code in the EEPROM 14.

If, however, the battery voltage is momentarily interrupted or abnormally drops, or if a noise happens to occur while the key ID code of the aforesaid key 2 is being transferred in series to the EEPROM 14, then the serial data may be partially "garbled" and an incorrect key ID code may be registered in the EEPROM 14 as a reference ID code. The incorrect key ID code thus registered as the reference key ID code presents a problem in that the engine cannot be started even if the right key is used to start the engine thereafter because the key ID code does not coincide with the reference ID code.

SUMMARY OF THE INVENTION

An object of the present invention is to provide a data processing apparatus for a vehicle which permits accurate, reliable transfer and registration of data from outside a vehicle into the vehicle.

According to the present invention, there is provided data processing apparatus for a vehicle which stores data received from outside the vehicle in nonvolatile memory means and executes predetermined data processing, wherein the nonvolatile memory means stores the data provided that the same data is received plural times in succession.

With the arrangement stated above, the data is stored as correct data only when the data received in succession from outside the vehicle coincides at least twice in a row. This prevents "garbled" data from being stored as correct data since such garbled data caused by a momentary interruption or abnormal drop of the battery voltage, noise, or the like during the transfer do not coincide with the immediately following received data.

DETAILED DESCRIPTION OF THE PREFERRED EMBODIMENT

Figure 1:
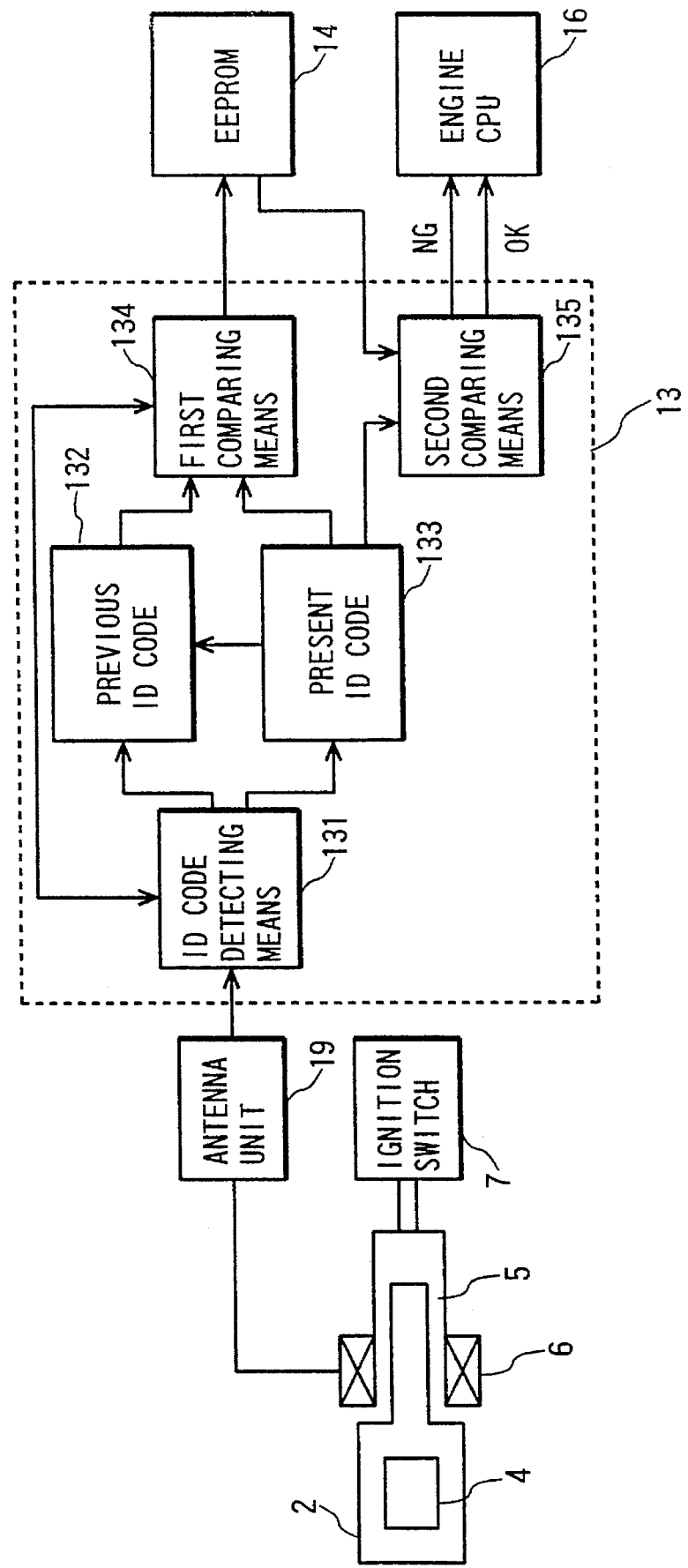
FIG. 1 is a block diagram showing an embodiment of the present invention.
Figure 5:
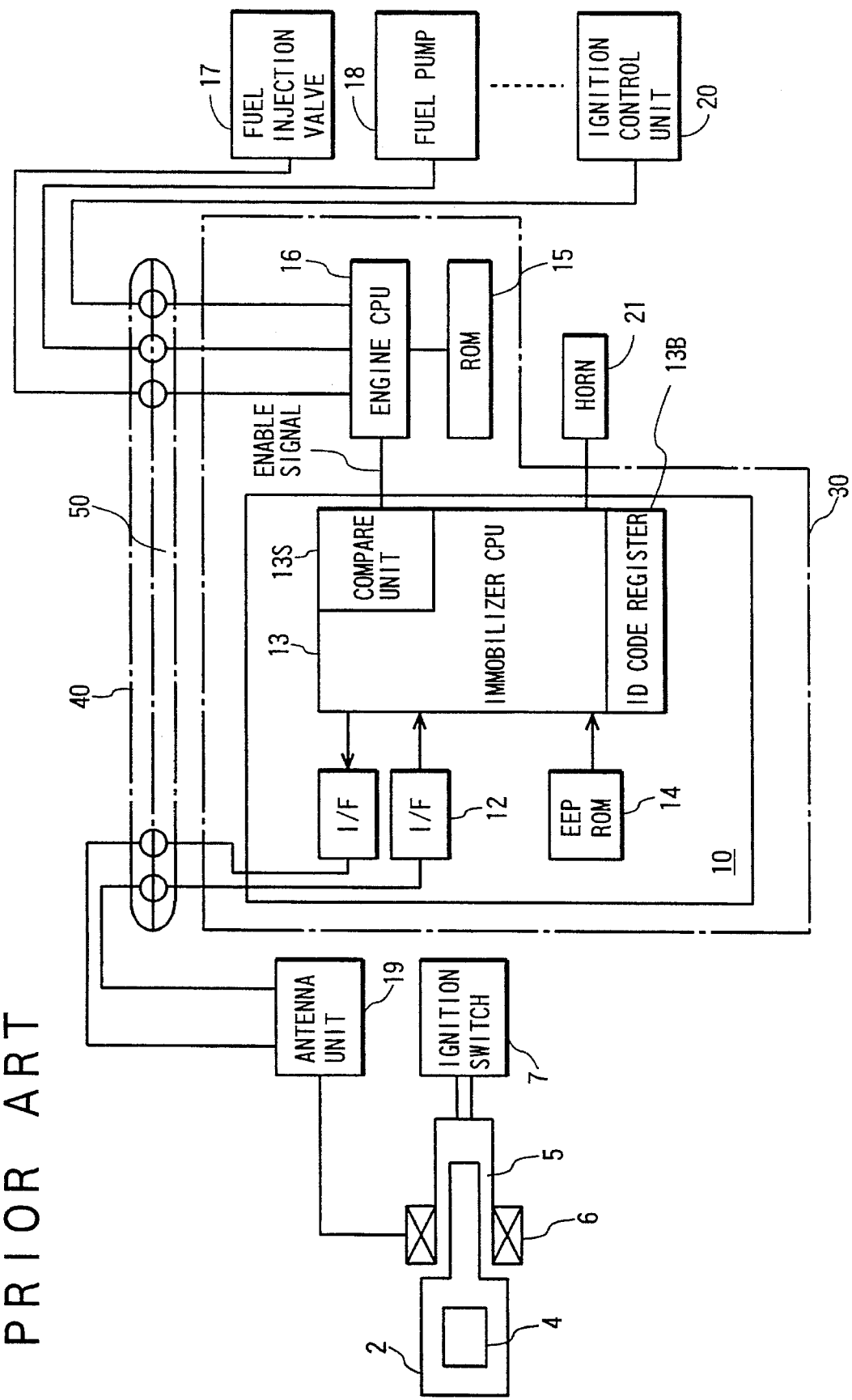
FIG. 5 is a block diagram showing the conventional vehicle anti-theft device.

Now, embodiments of the present invention are described in detail with respect to the drawing. FIG. 1 is a block diagram showing the function of the present invention, and the references used in the prior description of FIG. 5 represent the same or identical portions in FIG. 1.

The immobilizer CPU 13 incorporated in this embodiment is equipped with ID code detecting means 131, first memory means 132 for storing the previous or last ID code, second memory means 133 for storing the present ID code, first comparing means 134, and second comparing means 135.

When the key 2 is inserted into the ignition 5 and turned to the position where the ignition is activated, the ID code detecting means 131 detects the ID code which is repeatedly issued in succession from the antenna unit 19. The ID code which has been detected the n-th time (last time) is registered in the first memory means 132. The ID code which has been detected the (n+1)th time (present time) is registered in the second memory means 133.

Figure 4A:
FIGS. 4A and 4B are diagrams showing the signal waveforms of the signal which issued as the result of the comparison.
Figure 4B:

The first comparing means 134 compares the first ID code registered in the first memory means 132 with the second ID code registered in the second memory means 133 and if both ID codes coincide, then it registers said ID code as the reference ID code in the EEPROM 14. The second comparing means 135 compares the second ID code registered in the second memory means 133 with the reference ID code registered in the EEPROM 14 and if both ID codes coincide, then second comparing means 135 issues a pulse-shaped engine control enable (OK) signal shown in FIG. 4A to the engine CPU 16; if they do not coincide with each other, it issues the low-level engine control disable (NG) signal shown in FIG. 4B.

Figure 2:
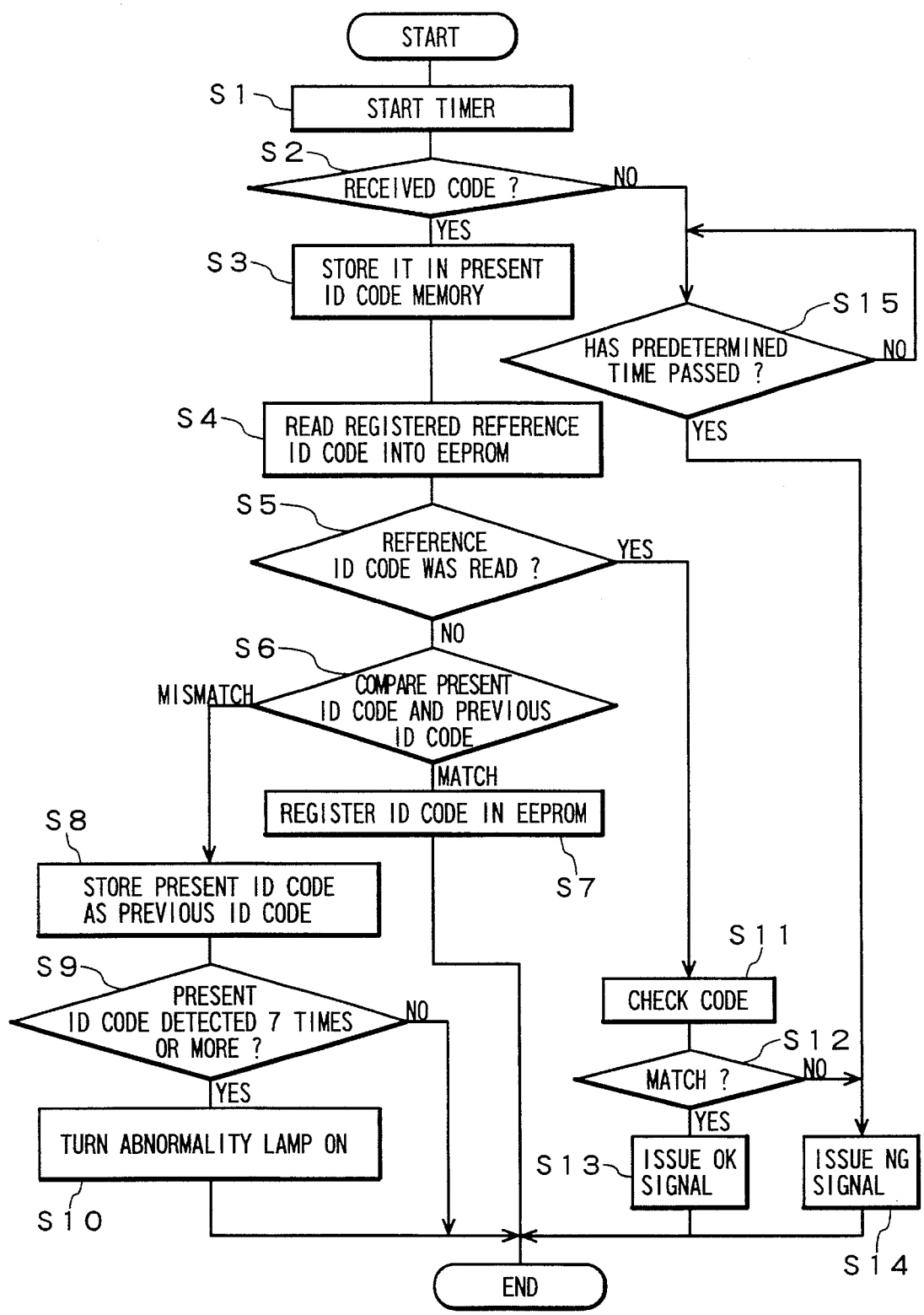
FIG. 2 is a flowchart showing an operation of FIG. 1.
Figure 3:
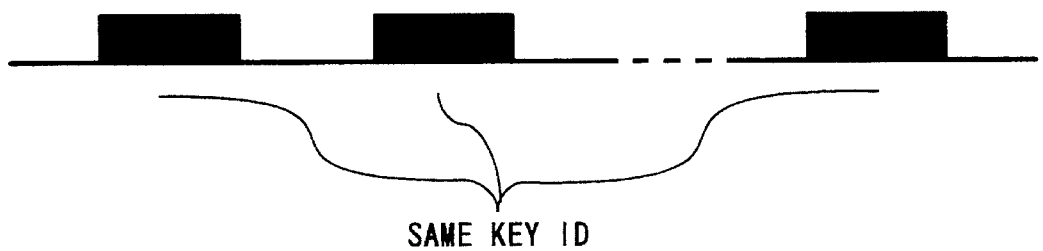
FIG. 3 is a diagram showing a method of ID code communication.

FIG. 2 is the flowchart showing the operation of the present embodiment described above. This program is periodically initiated when the key 2 is inserted in the ignition 5 to turn the ignition switch 7 ON.

In step S1, a timer, which is not shown, is started. In step S2, the ID code detecting means 131, which is one of the functions of the immobilizer CPU 13, determines whether the ID code has been received or not. When the ID code detecting means 131 detects a reception of the ID code, the detected ID code is registered in the second memory means 133 in step S3. In step S4, the reference ID code registered in the EEPROM 14 is read by the second comparing means 135. In step S5, it is determined whether the reference ID code has been read from the EEPROM 14 or not.

If the processing is being carried out for registering the reference ID code immediately after the vehicle has been completed, then the reference ID code has not yet been registered and the program proceeds to step S6. In step S6, the first comparing means 134 compares the first ID code in the first memory means 132 with the second ID code in the second memory means 133. At this point, the ID code has not yet been registered in the memory means 132 and therefore the program determines that these two ID codes do not coincide with each other and proceeds to step S8, wherein the ID code last detected is registered in the memory means 132. In step S9, it is determined whether the ID code has been detected 7 times (in general, a predetermined number of times) or more and if it is found the determination is negative, then the processing is terminated and the standby state follows.

As soon as the processing is initiated again, the processing steps from S1 through S5 are carried out as stated above and the program proceeds to step S6. In step S6, the first comparing means 134 compares the first ID code registered in the memory means 132 during the preceding processing, with the second ID code registered, in step S3 of the present processing, in the memory means 133.

If the first and second ID codes do not match, then the program goes from step S6 to step S8 to register the ID code detected this time in the memory means 132 as described above. In step S9, it is determined whether the ID code has been detected 7 times or more and it is determined abnormal if the ID code has been detected 7 times or more. In step S10, an indicator lamp (not shown) gives a visual display indicating the abnormality, then the processing is terminated.

If the ID code registered in the first memory means 132 coincides with that registered in the second memory means 133, then said ID code is determined to be the right ID code free of "garble". Said ID code is then registered as the reference ID code in the EEPROM 14 in step S7 before the processing is terminated.

After the reference ID code has been registered in the vehicle as described above and the vehicle has been delivered to a user along with the key 2, the reference ID code is determined to have been read from the EEPROM 14 in step S5 and the program proceeds to step S11. In step S11, the second ID code in the memory means 133 is compared with the reference ID code registered in the EEPROM 14 by the second comparing means 135. In step S12, it is determined whether both ID codes coincide with each other, and if they match, then it is determined that the legitimate key is being used to start the engine and the OK signal (FIG. 4A) is issued in step S13; if they do not match, then it is determined that an illegitimate key is being used and the NG signal (FIG. 4B) is issued in step S14.

If no ID code is detected within a predetermined time in step S2 or S15 stated above, it is also determined that an illegitimate key is being used and the NG signal is issued in step S14.

According to the embodiment, only when two successive ID codes which are read and output from the key 2 coincide with each other, the ID code is registered in the EEPROM 14 as the legitimate ID code free of "garble", that is, the right reference ID code. Thus, even if the ID code incurs "garble" during the serial transfer due to a momentary interruption and/or abnormal drop of the battery voltage, or noise or the like, it is possible to prevent such a "garbled" ID code from being registered as the reference ID code, thereby permitting accurate, reliable registration of the key ID code in the vehicle.

The above embodiment describes a case wherein only when two successive ID codes received in a row coincide with each other, the ID code is regarded as the legitimate ID code and registered as the reference ID code. The present invention, however, is not limited only thereto; the ID code may be registered as the reference ID code only when three or more successive ID codes all coincide with each other.

The above embodiment describes the case wherein the present invention is applied to vehicle anti-theft apparatus. The present invention, however, is not limited only thereto; it can be applied also to the data communication, processing, and the like carried out between an external failure diagnoser and the ECU installed on the vehicle.

According to the present invention, the data is stored as the right or reference data only when the data received in succession from outside the vehicle coincide with each other at least twice in a row. This prevents "garbled" data from being stored as the right data i.e., "garbled" data caused by momentary interruption and/or abnormal drop of the battery voltage, or noise.

What is claimed is:

1. A data processing apparatus for a vehicle comprising nonvolatile memory means, control means for controlling the registration of a reference ID code in said nonvolatile memory means, said apparatus being operative to execute predetermined data processing of a reference ID code that has been registered in said nonvolatile memory means and data subsequently received by said processing apparatus, said control means including monitoring means for determining whether any ID code is registered in said nonvolatile memory means, means for comparing successive occurrences of first data received from a source external of said data processing apparatus, and means for registering said first data as said reference ID code in said nonvolatile memory means when said comparison means determines that the same first data has been received a predetermined number of times in succession and said monitoring means determines there is no ID code already registered in said nonvolatile memory means.

2. The data processing apparatus of claim 1 wherein said predetermined number of times is at least two.

3. The data processing apparatus of claim 1 wherein said nonvolatile memory means is an electrically erasable programmable ROM (EEPROM).

4. A vehicle data processing apparatus which registers first data in nonvolatile memory means as a reference ID code and thereafter executes predetermined processing of said registered reference ID code and subsequently received second data, comprising:

monitoring means for determining whether any ID code has been registered in said nonvolatile memory means;

means for storing one of two successively received pieces of first data received from a source outside of said vehicle;

comparison means for comparing the other of said two pieces of successively received first data with said stored piece of first data; and means for registering one of said two pieces of first data in said nonvolatile memory means as said reference ID code in response to a determination by said comparison means that said two pieces of first data coincide with one another and a determination by said monitoring means that no ID code has been previously registered in said nonvolatile memory means.

5. A data processing apparatus for a vehicle comprising:

storage means for use in registering a reference code;

ID code detecting means for successively detecting ID codes that have been received in succession from a source outside of said vehicle;

means or determining whether any code data has been registered in said storage means when an ID code is detected by said ID code detecting means.

comparing means for comparing two successively received pieces of said ID code with one another when it has been determined that no code data is registered in said storage means; and means for registering one of said two successively received pieces of ID code in said storage means as the reference code when said comparing means has determined that said two successively received pieces of ID code coincide with one another.

6. A data processing apparatus for a vehicle according to claim 5, further comprising:

additional comparing means for comparing the reference code previously registered in said storage means with a subsequently received second ID code; and engine control means for enabling control of the engine in the vehicle when said additional comparing means determines that said registered reference code and said subsequently received second ID code coincide with each other, said engine control means being operative to disable the engine control if said registered reference code and said second ID code do not coincide.

* * * * *